United States Patent [19]

Ulmer et al.

[11] Patent Number: 5,597,870
[45] Date of Patent: Jan. 28, 1997

[54] PROCESS FOR MAKING $C_1$-$C_{22}$ DIALKYL ESTERS OF A COPOLYMER OF A MONOETHYLENICALLY UNSATURATED DICARBOXYLIC ACID AND A VINYL MONOMER

[75] Inventors: Herbert Ulmer, Hoboken; Robert B. Login, Oakland, both of N.J.

[73] Assignee: ISP Investments Inc., Wilmington, Del.

[21] Appl. No.: 558,405

[22] Filed: Nov. 16, 1995

[51] Int. Cl.$^6$ .............................. C08F 8/14; C08F 22/04; C08F 20/08
[52] U.S. Cl. ..................... 525/304; 525/327.7; 525/384
[58] Field of Search ................... 525/327.7, 384, 525/304

[56] References Cited

U.S. PATENT DOCUMENTS

| | | | |
|---|---|---|---|
| 2,306,071 | 12/1938 | McNally | 525/327.7 |
| 2,615,864 | 6/1949 | Giammaria | 525/384 |
| 2,997,464 | 8/1961 | Sellers | 525/327.7 |
| 4,908,413 | 3/1990 | Goertz | 525/304 |

Primary Examiner—Irina Zemel
Attorney, Agent, or Firm—Walter Katz; Marilyn J. Maue; Joshua J. Ward

[57] ABSTRACT

A process for making a $C_1$–$C_{22}$ dialkyl ester of a copolymer of a monoethylenically unsaturated dicarboxylic acid, anhydride or mono-$C_1$–$C_{22}$ alkyl ester thereof, and a vinyl monomer, such as a $C_1$–$C_{30}$ alkyl vinyl ether, which comprises reacting said copolymer with a $C_1$–$C_{22}$ alcohol in the presence of an esterification catalyst.

8 Claims, No Drawings

PROCESS FOR MAKING $C_1$-$C_{22}$ DIALKYL ESTERS OF A COPOLYMER OF A MONOETHYLENICALLY UNSATURATED DICARBOXYLIC ACID AND A VINYL MONOMER

BACKGROUND OF THE INVENTION

1. Field of the Invention

This invention relates to a process for making dialkyl esters of a copolymer of a monoethylenically unsaturated dicarboxylic acid and a vinyl monomer.

2. Description of the Prior Art

FR-A-1,527,411 described copolymers of maleic acid anhydride, alkenes and alkyl vinyl ether monomers precipitation polymerization of the monomers, for example, in benzene in the presence of radical-forming polymerization initiators. The anhydride group of the copolymers can be hydrolyzed after copolymerization and also neutralized.

BE-A-710,985 described terpolymers made from alkyl vinyl ethers, maleic acid anhydride, and a third monomer, such as acrylic acid, methacrylic acid, methacrylamide, vinyl chloride, or styrene.

NE-A 68/10081 described a process of making copolymers of maleic acid anhydride, alkyl vinyl ethers or ethylene acetate, propylene acetate, or vinyl acetate, and 1-alkenes or long-chained vinyl alkyl ethers, in an inert solvent.

EP-A-0,428,956 described a process for making copolymers of maleic acid monoalkyl esters, alkyl vinyl ethers, and maleic acid anhydride. In this process, an excess of alkyl vinyl ether is used both as a solvent and precipitating agent. The specific viscosity or the chain length of the copolymers was controlled by the ratio of maleic acid monoalkyl ester to maleic acid anhydride.

U.S. Pat. No. 5,064,897 described the preparation of copolymers of monoalkyl maleates and alkyl vinyl ethers. In this patent, a 6- to 10-fold excess of alkyl vinyl ether was used, and the monomeric monoalkyl maleate was prepared prior to polymerization by the reaction of alcohols with maleic acid anhydride in equimolar ratios.

The conversion of polymers containing maleic acid anhydride units with alcohols in a polymer-analogous reaction is known, for example, from JP-A-1983/25,982, GB-A-1,233, 468, DE-A-1,930,009, EP-A-0,310,079, and EP-A-0,461, 489.

German Patent No. DE 4,216,318 described a one-pot method for the preparation of polymers containing, in polymerized from: (a) 2–50 mole % of alkyl vinyl ethers having 3°–30° C. atoms in the molecule; (b) 10–88 mole % of monoethylenically unsaturated dicarboxylic acid anhydrides; and (c) 10–88 mole % of dialkyl esters of monoethylenically unsaturated dicarboxylic acids, as characteristic monomer units, by polymerizing monomers (a), (b), and (c) at temperatures of 40°–180° C. in the presence of a radical-forming initiator. However, this one-pot process generally will produce inhomogeneous polymers because each of the three monomers have very different copolymerization reaction rates with the other monomers.

Accordingly, it is an object of this invention to provide a process for making dialkyl esters of a copolymer of a monoethylenically unsaturated dicarboxylic acid and a vinyl monomer, which does not require a one-pot polymerization of all monomers in the polymer.

SUMMARY OF THE INVENTION

A process for making a $C_1$-$C_{22}$ dialkyl ester of a copolymer of a monoethylenically unsaturated dicarboxylic acid, anhydride or mono-$C_1$-$C_{22}$ alkyl ester thereof, and a vinyl monomer, which comprises reacting said copolymer with a sufficient molar excess of a $C_1$-$C_{22}$ alcohol in the presence of an esterification catalyst, to produce the desired dialkyl ester.

DETAILED DESCRIPTION OF THE INVENTION

In accordance with the invention, the starting material for forming the dialkyl esters by the process herein is a copolymer of a monoethylenically unsaturated dicarboxylic acid, anhydride or mono-$C_1$-$C_{22}$ alkyl ester thereof, and a vinyl monomer, e.g. a $C_1$-$C_{30}$ alkyl vinyl ether, an acrylate, or methacrylate, a vinyl acetate, a styrene-based monomer such as copolymers of maleic acid or anhydride, itaconic acid or anhydride, glutaconic acid or anhydride, methylenemalonic acid or anhydride, citraconic acid or anhydride, and mixtures of these acids or anhydrides; preferably maleic acid or anhydride units, containing 10–88 mole %, preferably 20–60 mole %, in the copolymer; and a vinyl monomer, e.g. a $C_1$-$C_{22}$ alkyl vinyl ether such as methyl vinyl ether, ethyl vinyl ether, isopropyl vinyl ether, n-propyl vinyl ether, n-butyl vinyl ether, isobutyl vinyl ether, octyl vinyl ether, n-hexadecyl vinyl ether, n-octadecyl vinyl ether, n-eicosyl vinyl ether and n-hexacosyl vinyl ether, as a single ether, or a mixture of several vinyl ethers; an acrylate or methacrylate; vinyl acetate, or a styrene monomer. Suitably the vinyl monomer, e.g. methyl vinyl ether, ethyl vinyl ether, octadecyl vinyl ether, cyclohexyl vinyl ether, among others, is present in the copolymer in an amount of 50 mole %, preferably 25–50 mole %.

The dialkyl ester component of the copolymer is a $C_1$-$C_{22}$ dialkyl ester which is provided by reacting the copolymer with a $C_1$-$C_{22}$ alcohol, preferably ethanol or butanol, and is present in the copolymer in an amount of about 10–88 mole %, preferably 20–60 mole %.

The process of the invention is carried out by esterification of the copolymer of the monoethylenically unsaturated dicarboxylic acid, anhydride or mono $C_1$-$C_{22}$ alkyl ester thereof, and the vinyl monomer, e.g. a $C_1$-$C_{30}$ alkyl vinyl ether, with a sufficient molar excess of a $C_1$-$C_{22}$ alcohol in the presence of an esterification catalyst, at elevated temperature and superatmospheric pressure, to produce the desired dialkyl ester product. Preferably the alcohol is ethanol or butanol.

The esterification catalyst suitably is a strong acid, preferably sulfuric acid, an organic sulfonic acid such as methane or toluene sulfonic acid, an acid-group containing ion-exchange resin, or a strong inorganic acid such as phosphoric acid. Sulfuric acid or ion exchange resin equivalent thereof is preferred.

In a typical run, the monoethyl ester of a copolymer of maleic anhydride and methyl vinyl ether (Gantrez® ES-225-ISP) is esterified in ethanol at a temperature of about 100°–120° C., under superatmospheric pressure, in the presence of about 0.1–3% by weight concentrated sulfuric acid, for about 3–6 hours, at a solids content of about 10–75%, preferably 30–60%. The reaction product is the desired diethyl ester of the copolymer in a more or less random or homogeneous distribution in the copolymer.

EXAMPLE 1

A 20% (by weight) ethanol solution of Gantrez® ES-225 was prepared and approximately 2% (by weight) concentrated sulfuric acid was added to the solution. Then the mixture was heated with stirring to 110° C. for 1 hour in a pressure vessel; thereafter at 117° C. for an additional 2 hours. The reaction product was the desired diethyl ester, as determined by acid analysis of the polymer.

EXAMPLE 2

The process of Example 1 was repeated except that 10 g. of Amberlyst® 15 was used as the esterification catalyst instead of sulfuric acid, with similar results.

EXAMPLE 3

The process of Example 1 was repeated using Gantrez® AN-119BF in place of Gantrez® ES-225 with similar results.

While the invention has been described with particular reference to certain embodiments thereof, it will be understood that changes and modifications may be made which are within the skill of the art. Accordingly, it is intended to be bound only by the following claims, in which:

What is claimed is:

1. A process for making a $C_1$–$C_{22}$ dialkyl ester of a copolymer of a monoethylenically unsaturated dicarboxylic acid mono-$C_1$–$C_{22}$ alkyl ester thereof, and a vinyl monomer, which comprises reacting said copolymer with a molar excess of $C_1$–$C_{22}$ alcohol in the presence of an esterification catalyst sufficient to form the desired dialkyl ester product at an elevated temperature above 100° C., and at a superatmospheric pressure.

2. A process according to claim 1 wherein said alcohol is ethanol or butanol.

3. A process according to claim 1 wherein said esterification catalyst is an acid.

4. A process according to claim 3 wherein said acid is sulfuric acid, a organic sulfonic acid, or a sulfonic group-containing ion-exchange resin.

5. A process according to claim 1 wherein the dialkyl ester is the diethyl ester, the alcohol is ethanol, the copolymer is the monoethyl ester of a copolymer of maleic anhydride and methyl vinyl ether, the esterification catalyst is sulfuric acid, and the reaction temperature is about 100°–120° C.

6. A process according to claim 1 wherein the esterification catalyst is an ion-exchange resin containing sulfonic acid groups.

7. A process according to claim 5 wherein the concentration of sulfuric acid is about 0.1–2%, the reaction is carried out for about 3–6 hours, and the solids content of the reaction mixture is about 10–50%.

8. A process according to claim 1 wherein said vinyl monomer is a $C_1$–$C_{30}$ alkyl vinyl ether.

* * * * *